(12) United States Patent
Park et al.

(10) Patent No.: US 12,001,880 B2
(45) Date of Patent: Jun. 4, 2024

(54) MULTI-CORE SYSTEM AND METHOD OF CONTROLLING OPERATION OF THE SAME

(71) Applicant: SAMSUNG ELECTRONICS CO., LTD., Suwon-si (KR)

(72) Inventors: Bumgyu Park, Suwon-si (KR); Jonglae Park, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 303 days.

(21) Appl. No.: 16/822,373

(22) Filed: Mar. 18, 2020

(65) Prior Publication Data

US 2021/0011759 A1   Jan. 14, 2021

(30) Foreign Application Priority Data

Jul. 11, 2019  (KR) ........................ 10-2019-0083853

(51) Int. Cl.
| | |
|---|---|
| *G06F 9/48* | (2006.01) |
| *G06F 9/30* | (2018.01) |
| *G06F 9/50* | (2006.01) |
| *G06F 9/54* | (2006.01) |
| *G06F 11/30* | (2006.01) |
| *G06F 11/34* | (2006.01) |

(52) U.S. Cl.
CPC ........ *G06F 9/4881* (2013.01); *G06F 9/30083* (2013.01); *G06F 9/4837* (2013.01); *G06F 9/485* (2013.01); *G06F 9/4893* (2013.01); *G06F 9/5027* (2013.01); *G06F 9/5038* (2013.01); *G06F 9/505* (2013.01); *G06F 9/542* (2013.01); *G06F 9/546* (2013.01); *G06F 11/3024* (2013.01); *G06F 11/3419* (2013.01); *G06F 11/3433* (2013.01)

(58) Field of Classification Search
CPC .......... G06F 9/48; G06F 9/4837; G06F 9/485; G06F 9/4881; G06F 9/4893; G06F 9/50; G06F 9/5027; G06F 9/5038; G06F 9/505; G06F 9/54; G06F 9/542; G06F 9/546; G06F 11/3024; G06F 9/30083
See application file for complete search history.

(56) References Cited

U.S. PATENT DOCUMENTS

| | | |
|---|---|---|
| 7,293,092 B2 | 11/2007 | Sukegawa |
| 8,695,009 B2 | 4/2014 | Vojnovic et al. |
| 10,055,259 B2 | 8/2018 | Lo et al. |
| 10,078,520 B1 | 9/2018 | Chirayath |
| 2010/0037234 A1 | 2/2010 | Udupa et al. |

(Continued)

FOREIGN PATENT DOCUMENTS

| | | |
|---|---|---|
| JP | 1995-021040 | 1/1995 |
| JP | 2002-304384 | 10/2002 |
| KR | 10-1658792 | 9/2016 |

*Primary Examiner* — Charles M Swift
(74) *Attorney, Agent, or Firm* — F. Chau & Associates, LLC

(57) ABSTRACT

A method of controlling an operation of a multi-core system including a plurality of processor cores, includes, monitoring task execution delay times with respect to tasks respectively assigned to the plurality of processor cores, monitoring core execution delay times with respect to the plurality of processor cores and controlling an operation of the multi-core system based on the task execution delay times and the core execution delay times.

16 Claims, 14 Drawing Sheets

(56) References Cited

U.S. PATENT DOCUMENTS

| | | | |
|---|---|---|---|
| 2012/0101973 A1* | 4/2012 | Ito | G06F 16/185 |
| | | | 706/50 |
| 2012/0266176 A1* | 10/2012 | Vojnovic | G06F 9/5038 |
| | | | 718/104 |
| 2014/0173150 A1* | 6/2014 | Yu | G06F 1/3203 |
| | | | 710/267 |
| 2015/0355700 A1* | 12/2015 | Pusukuri | G06F 1/324 |
| | | | 713/323 |
| 2016/0098292 A1* | 4/2016 | Boutin | G06F 9/505 |
| | | | 718/104 |
| 2016/0204923 A1* | 7/2016 | Ashok | G06F 9/45558 |
| | | | 709/226 |
| 2017/0024316 A1* | 1/2017 | Park | G06F 12/084 |
| 2017/0185511 A1* | 6/2017 | Chiu | G06F 3/0604 |
| 2017/0373955 A1* | 12/2017 | Kocoloski | G06F 9/4893 |
| 2018/0300174 A1* | 10/2018 | Karanasos | G06F 9/4881 |

* cited by examiner

MULTI-CORE SYSTEM AND METHOD OF CONTROLLING OPERATION OF THE SAME

CROSS-REFERENCE TO RELATED APPLICATION

This U.S. non-provisional application claims priority under 35 USC § 119 to Korean Patent Application No. 10-2019-0083853, filed on Jul. 11, 2019, in the Korean Intellectual Property Office (KIPO), the disclosure of which is incorporated by reference in its entirety herein.

BACKGROUND

1. Technical Field

Example embodiments relate generally to semiconductor integrated circuits, and more particularly to a multi-core system and a method of controlling an operation of the multi-core system.

2. Discussion of Related Art

A plurality of tasks may be performed substantially at the same time on a computer system including multiple processors or including a processor with multiple cores. Task scheduling schemes to perform the tasks may include a round robin scheme, a priority-based scheme such as random multiple access (RMA) scheduling, and a deadline-based scheme such as earliest deadline first (EDF) scheduling. Runnable tasks may be assigned to processor cores sequentially according to the round robin scheme, or a next task to be processed may be determined based on urgency or importance degree according to the priority-based task scheduling. In addition, task scheduling may be performed statically as the RMA scheduling or dynamically as the EDF scheduling based on frequency and/or a deadline of the tasks. However, efficiency of these scheduling schemes may degrade when the tasks are irregular and are highly dependent on data.

SUMMARY

At least one exemplary embodiment of the inventive concept may provide a multi-core system and a method of controlling an operation of the multi-core system for efficient task scheduling.

According to an exemplary embodiment of the inventive concept, a method of controlling an operation of a multi-core system including a plurality of processor cores, includes, monitoring task execution delay times with respect to tasks respectively assigned to the plurality of processor cores, monitoring core execution delay times with respect to the plurality of processor cores and controlling an operation of the multi-core system based on the task execution delay times and the core execution delay times.

According to an exemplary embodiment of the inventive concept, a multi-core system includes a multi-core processor including a plurality of processor cores, first control logic configured to monitor task execution delay times with respect to tasks respectively assigned to the plurality of processor cores and core execution delay times with respect to the plurality of processor cores and second control logic configured to control an operation of the multi-core system based on the task execution delay times and the core execution delay times According to an exemplary embodiment of the inventive concept, a method of controlling an operation of a multi-core system including a plurality of processor cores, includes, monitoring task execution delay times with respect to tasks respectively assigned to the plurality of processor cores, the task execution delay time of a given task of the tasks assigned to a given processor core of the processor cores corresponding to a standby time while the given task is not executed by the given processor core after the given task is stored in a task queue of the given processor core; monitoring core execution delay times with respect to the plurality of processor cores, the core execution delay time of the given processor core corresponding to a sum of the task execution delay times associated with the given processor core or a maximum task execution delay time of the task execution delay times associated with the given processor core; determining whether a task execution delay has occurred with respect to the tasks assigned to each processor core or whether a core execution delay has occurred with respect to each processor core, based on the task execution delay times of the tasks assigned to each processor core and the core execution delay times of each processor core; and relocating the given task assigned to the given processor core to another one of the processor cores or increasing a power level of the given processor core when it is determined that the task execution delay of the given tasks or the core execution delay of the given processor core has occurred.

BRIEF DESCRIPTION OF THE DRAWINGS

Exemplary embodiments of the present inventive concept will be more clearly understood from the following detailed description taken in conjunction with the accompanying drawings.

DETAILED DESCRIPTION OF THE EXEMPLARY EMBODIMENTS

Figure 1:
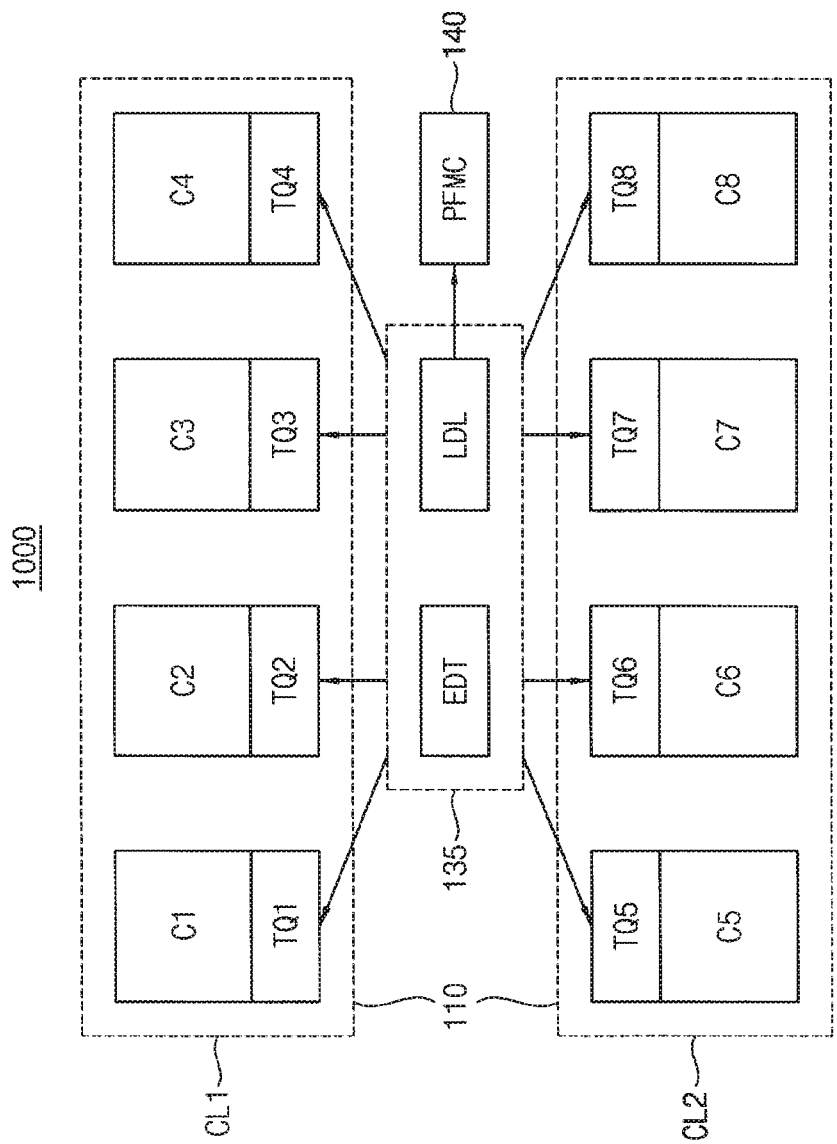
FIG. 1 is a block diagram illustrating a multi-core system according to an exemplary embodiment of the inventive concept.
Figure 2:
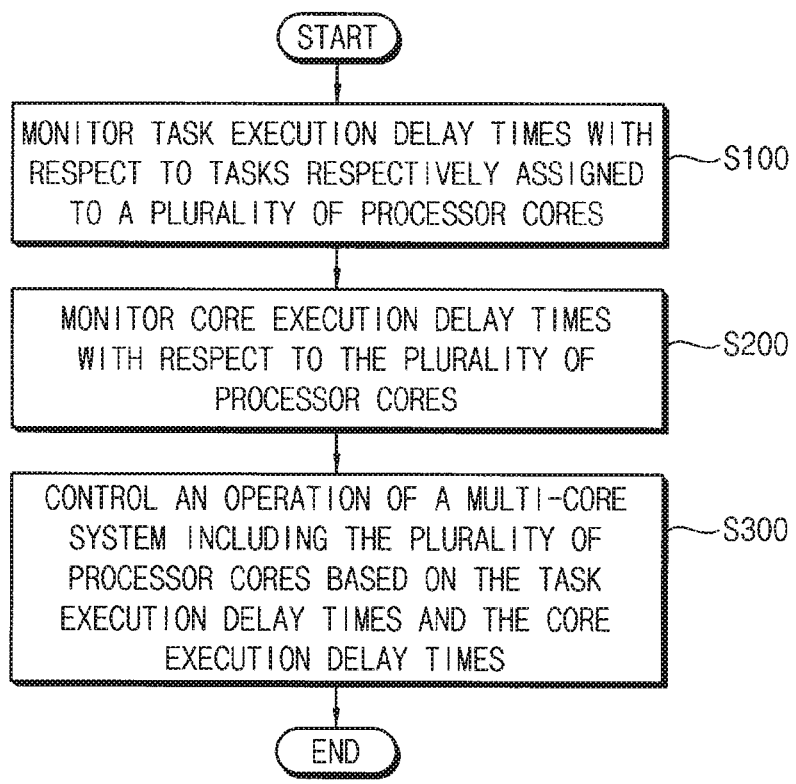
FIG. 2 is a flow chart illustrating a method of controlling an operation of a multi-core system according to an exemplary embodiment of the inventive concept.

The inventive concept will be described more fully hereinafter with reference to the accompanying drawings, in which some exemplary embodiments thereof are shown. In the drawings, like numerals refer to like elements throughout. FIG. 1 is a block diagram illustrating a multi-core system according to an exemplary embodiment of the inventive concept, and FIG. 2 is a flow chart illustrating a method of controlling an operation of the multi-core system.

FIG. 1 illustrates a schematic configuration of a multi-core system according to an exemplary embodiment of the inventive concept. Referring to FIG. 1, a multi-core system 1000 includes a processor 110, a task scheduler 135 and a performance controller PFMC 140. The multi-core system 1000 may include further components, and a more detailed configuration of the multi-core system 1000 will be described below with reference to FIG. 3.

The multi-core system 1000 may be implemented as a system-on-chip 1 that may be included in various computing devices. The computing device may be one of a mobile phone, a smart phone, an enterprise digital assistant (EDA), a digital still camera, a digital video camera, a portable multimedia player (PMP), a personal navigation device or a portable navigation device (PND), a mobile internet device (MID), a wearable computer, an internet of things (JOT) device, an internet of everything (JOE), or an e-book reader.

The multi-core system 1000 may transmit and receive data and task requests to and from a host device (not shown) through an interface (e.g., an interface circuit). For example, the task requests may include a request to perform an operation on the data. For example, the interface may be connected to the host device via a parallel AT attachment (PATA) bus, a serial AT attachment (SATA) bus, a small computer system interface (SCSI), universal serial bus (USB), peripheral component interconnect express (PCIe), etc.

The processor 110 may include a plurality of processor cores C1~C8 and a plurality of task queues TQ1~TQ8 respectively assigned to the plurality of processor cores C1~C8. While FIG. 1 illustrates eight processor cores C1~C8 and eight task queues, the inventive concept is not limited thereto. For example, the processor 110 may include less than eight processor cores or more than eight processor cores and the processor 110 may include less than eight task queues or more than eight task queues.

The processor cores C1~C8 may be either homogeneous processor cores or heterogeneous processor cores. When the processor cores C1~C8 are homogeneous processor cores, each core is a same type. When the processor cores C1~C8 are heterogeneous processor cores, some of the cores are different types.

When the processor cores C1~C8 are heterogeneous processor cores, they may be sorted into a first cluster CL1 and a second cluster CL2. Among the processor cores C1~C8, the first cluster CL1 may include high-performance cores C1~C4 having a first processing speed, and the second cluster CL2 may include low-performance cores C5~C8 having a second processing speed that is smaller than the first processing speed. While FIG. 1 illustrates that each cluster includes a same number of processor cores, the inventive concept is not limited thereto. For example, the first cluster CL1 may include more processing cores than the second cluster CL2 or the first cluster CL1 may include less processing cores that the second cluster CL2. Further, there may be more than two clusters.

According to an exemplary embodiment, the processor cores C1~C8 have a per-core dynamic voltage and frequency scaling (DVFS) architecture. In the per-core DVFS architecture, the processor cores C1~C8 may be included different power domains, and voltages having different levels and clock signals having different frequencies may be supplied to the processor cores C1~C8. Power supplied to the processor cores C1~C8 may be blocked by a hotplug-out scheme. In other words, a portion of the processor cores C1~C8 may execute assigned tasks and the power to the other portion of the processor cores C1~C8 in an idle state may be blocked. In contrast, when the workload is too heavy for the powered processor cores, the power may be supplied to at least one of the processor cores in the idle state to execute the tasks, which is referred to as "hotplug-in".

The task scheduler 135 may include an execution delay tracker EDT and control logic LDL.

The task scheduler 135 and the PFMC 140 may each be implemented as hardware, software or a combination of hardware and software. For example, the hardware may be a processor or a logic circuit including various logic gates. It should be understood that the software may be a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

The task scheduler 135 may assign or distribute the tasks to the task queues TQ1~TQ8, based on task execution delay times and core execution delay times as will be described below with reference to FIG. 2. One or more of the task queues TQ1~TQ8 may be implemented as hardware (e.g., a latch, a buffer, a shifter register, etc.) within the processor core or as a data structure included in a kernel of an operation system (OS).

Referring to FIGS. 1 and 2, the execution delay tracker EDT monitors task execution delay times with respect to tasks respectively assigned to the plurality of processor cores C1~C8 (S100).

In an exemplary embodiment, a task execution delay time corresponds to a standby time while a task is not executed by a processor core after the task is stored in a task queue of the corresponding processor core.

In an exemplary embodiment, as will be described below with reference to FIG. 7, a task execution delay time may correspond to a start standby time from a time point when a task is stored in the task queue of a processor core to a start time point when the corresponding processor core starts executing the task. For example, if a task is placed in task queue TQ1 at time 0 and then processor core C1 starts processing the task at time 100, then the task execution delay time would be 100.

In an exemplary embodiment, as will be described below with reference to FIGS. 11 and 12, a task execution delay time corresponds to a sum of a start standby time from a time point when a given task is stored in the task queue of a given processor core to a start time point when the given processor core starts executing the given task and a stall time while the given processor core stops executing the given task after the start time point. For example, if a task is placed in task queue TQ1 at time 0, the processor core C1 starts executing the task at time 100, and then the processor C1 needs to stop executing the task at time 150 until it acquires access to a necessary resource at time 300, the start standby time is 100, the stall time is 150, and the task execution delay time 250 (e.g., a sum of 100 and 150=250).

In addition, the execution delay tracker EDT monitors core execution delay times with respect to the plurality of processor cores (S200).

In an exemplary embodiment of the inventive concept, a core execution delay time corresponds to a sum of the task execution delay times associated with a given one of the processor cores. The sum may be calculated for a given period. For example, the sum could be calculated from the task execution delay times associated with a given one of the processor cores that occur during the given period.

In an exemplary embodiment of the inventive concept, a core execution delay time corresponds to a maximum task execution delay time of the task execution delay times associated with a given one of processor cores.

The control logic LDL controls an operation of the multi-core system based on the task execution delay times and the core execution delay times (S300).

The control logic LDL may determine whether a task execution delay has occurred with respect to the tasks assigned to each processor core or whether a core execution delay has occurred with respect to each processor core, based on the task execution delay times of the tasks assigned to each processor core and the core execution delay time associated with each processor core.

In an exemplary embodiment, the control logic LDL performs task scheduling for efficiently assigning runnable tasks to the processor cores C1~C8 based on the task execution delay times and the core execution delay times. For example, the control logic LDL may relocate a portion of the tasks assigned to each processor core to another processor core when it is determined that the task execution delay or the core execution delay has occurred for a corresponding processor core.

In an exemplary embodiment, the control logic LDL controls power levels of the processor cores C1~C8 based on the task execution delay times and the core execution delay times. The power level may be represented by an operation voltage and/or an operation frequency of each processor core. For example, the control logic LDL may resolve an execution delay state associated with a processor core rapidly by raising a power level of the processor or by raising the operation frequency of the processor core when it is determined that the task execution delay or the core execution delay has occurred for the corresponding processor core.

As such, the multi-core system and method of controlling an operation of the multi-core system according to at least one exemplary embodiment of the inventive concept may reduce or eliminate task starvation where a specific task is not processed for a long time, using the task execution delay times and core execution delay times and implement efficient task scheduling even for the tasks having high dependency on data.

Figure 3:
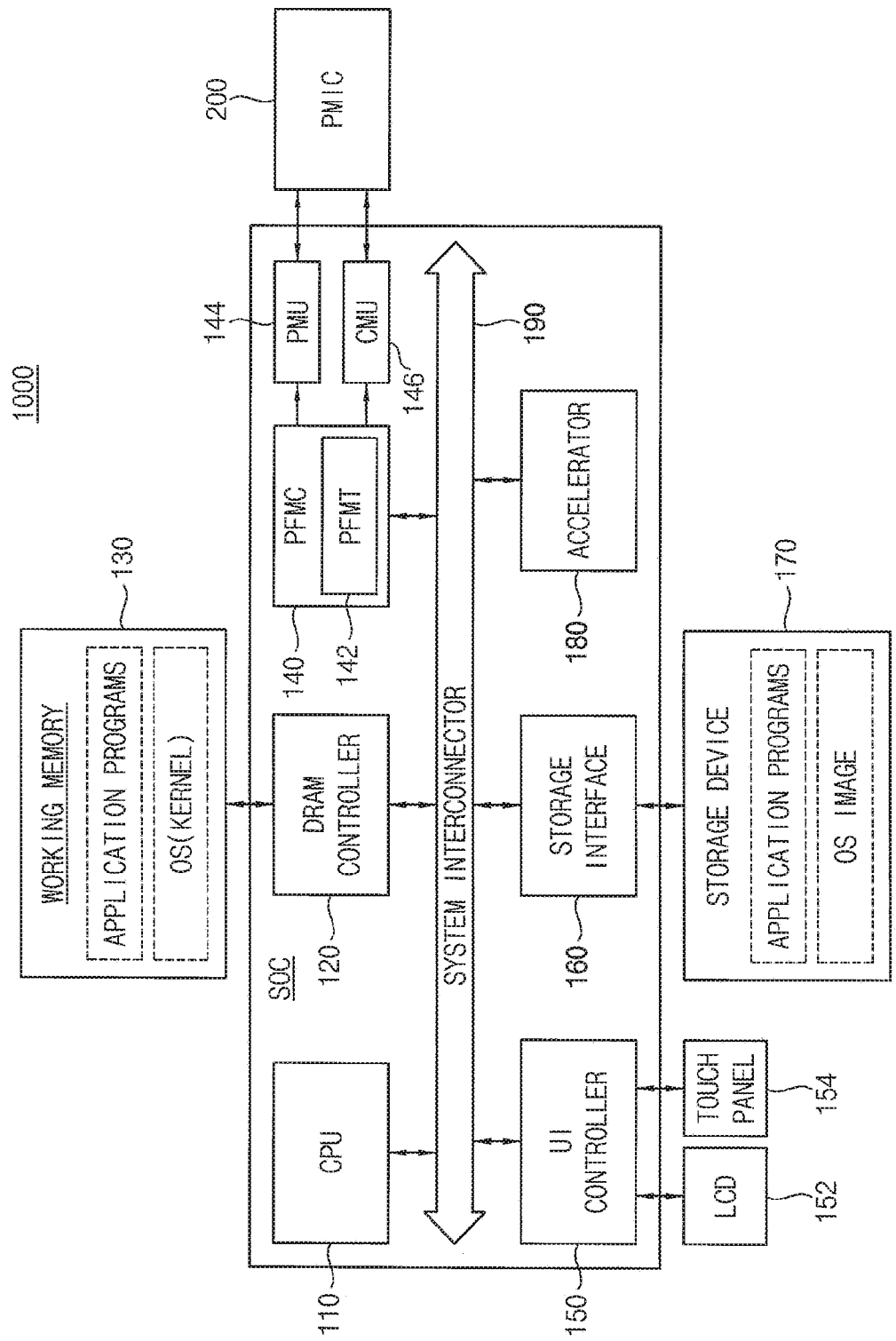
FIG. 3 is a block diagram illustrating a multi-core system according to an exemplary embodiment of the inventive concept.

FIG. 3 is a block diagram illustrating a multi-core system according to an exemplary embodiment of the inventive concept.

Referring to FIG. 3, the multi-core system 1000 includes a system on chip (SoC), a working memory 130, a display device (LCD) 152, a touch panel 154, a storage device 170, a power management integrated circuit (PMIC), etc. The SoC may include a central processing unit (CPU) 110, a DRAM controller 120 (e.g., a control circuit), a performance controller 140 (e.g., a control circuit), a user interface controller (UI controller (e.g., a control circuit)) 150, a storage interface 160 (e.g., an interface circuit), and an accelerator 180 (e.g., a graphics accelerator), a power management unit (PMU) 144, and a clock management unit (CMU) 146. It will be understood that components of the multi-core system 1000 are not limited to the components shown in FIG. 3. For example, the multi-core system 1000 may further include a hardware codec for processing image data or a security block.

The processor 110 executes software (for example, an application program, an operating system (OS), and device drivers) for the multi-core system 1000. The processor 110 may execute the operating system (OS), which may be loaded into the working memory 130. The processor 110 may execute various application programs to be driven by the operating system (OS). The processor 110 may be provided as a homogeneous multi-core processor or a heterogeneous multi-core processor. A multi-core processor is a computing component including at least two independently drivable processors (hereinafter referred to as "cores"). Each of the cores may independently read and execute program instructions.

Each of the processor cores of the processor 110 may include a plurality of power domains that operate with an independent driving clock signal and an independent driving voltage. The driving voltage and the driving clock signal provided to each of the processor cores may be cut off or provided in units of single cores. Hereinafter, an operation of cutting off the driving voltage and the driving clock provided to each of the power domains from a specific core will be referred to as "hotplug-out". An operation of providing the driving voltage and the driving clock to a specific core will be referred to as "hotplug-in". In addition, a frequency of the driving clock signal and a level of the driving voltage provided to each of the power domains may vary depending on a processing load of each core. For example, as time required for processing tasks becomes longer, each of the cores may be controlled by means of dynamic voltage frequency scaling (hereinafter referred to as "DVFS") that increases the frequency of the driving clock signal or the level of the driving voltage provided to a corresponding power domain. According to an exemplary embodiment of the present inventive concept, hotplug-in and hotplug-out are performed with reference to the level of the driving voltage and the frequency of the driving clock of the processor 110 adjusted through DVFS.

A kernel of the operating system (OS) may monitor the number of tasks in a task queue and the driving voltage and the driving clock signal of the processor 110 at specific time intervals to control the processor 110. In addition, a kernel of the operating system (OS) may control hotplug-in or hotplug-out of the processor 110 with reference to the monitored information.

The DRAM controller 120 provides interfacing between the working memory 130 and the system-on-chip (SoC). The DRAM controller 120 may access the working memory 130 according to a request of the processor 110 or another intellectual property (IP) block. The IP block may be a reusable unit of logic, a cell, or integrated circuit layout design that is the intellectual property of one party. For example, the DRAM controller 120 may write data into the working memory 130 according to a write request of the processor 110. Alternatively, the DRAM controller 120 may read data from the working memory 130 according to a read request of the processor 110 and transmit the read data to the processor 110 or the storage interface 160 through a data bus.

The operating system (OS) or basic application programs may be loaded into the working memory 130 during a booting operation. For example, an OS image stored in the storage device 170 is loaded into the working memory 130 based on a booting sequence during booting of the multi-core system 1000. Overall input/output operations of the multi-core system 1000 may be supported by the operating system (OS). Similarly, application programs may be loaded into the working memory 130 to be selected by a user or to provide a basic service. Moreover, the working memory 130 may be used as a buffer memory to store image data provided from an image sensor such as a camera. The working memory 130 may be a volatile memory such as a static random access memory (SRAM) and a dynamic random access memory (DRAM) or a nonvolatile memory device such as a phase-change random-access memory (PRAM), a magnetoresistive random-access memory (MRAM), a resistive random-access memory (ReRAM), a ferroelectric random-access memory (FRAM), and a NOR flash memory.

The performance controller 140 may adjust operation parameters of the system-on-chip (SoC) according to a control request provided from the kernel of the operating system (OS). For example, the performance controller 140 may adjust the level of DVFS to enhance performance of the system-on-chip (SoC). For example, the performance controller 140 may control a driving mode of a multi-core processor such as Big.LITTLE (a heterogeneous computing architecture developed by ARM Holdings) of the processor 110 according to a request of the kernel. In this case, the performance controller 140 may include a performance table 142 to set a driving voltage and a frequency of a driving clock signal therein. The performance controller 140 may control the PMU 144 and the CMU 146 connected to the PMIC 200 to provide the determined driving voltage and the determined driving clock signal to each power domain.

The user interface controller 150 controls user input and output from user interface devices. For example, the user interface controller 150 may display a keyboard screen for inputting data to the LCD 152 according to the control of the processor 110. Alternatively, the user interface controller 150 may control the LCD 152 to display data that a user requests. The user interface controller 150 may decode data provided from user input means, such as the touch panel 154, into user input data.

The storage interface 160 accesses the storage device 170 according to a request of the processor 110. For example, the storage interface 160 provides interfacing between the system-on-chip (SoC) and the storage device 170. For example, data processed by the processor 110 is stored in the storage device 170 through the storage interface 160. Alternatively, data stored in the storage device 170 may be provided to the processor 110 through the storage interface 160.

The storage device 170 is provided as a storage medium of the multi-core system 1000. The storage device 170 may store application programs, an OS image, and various types of data. The storage device 170 may be provided as a memory card (e.g., MMC, eMMC, SD, MicroSD, etc.). The storage device 170 may include a NAND-type flash memory with high-capacity storage capability. Alternatively, the storage device 170 may include a next-generation nonvolatile memory such as PRAM, MRAM, ReRAM, and FRAM or a NOR-type flash memory. According to an exemplary embodiment of the inventive concept, the storage device 170 may be an embedded memory incorporated in the system-on-chip (SoC).

The accelerator 180 may be provided as a separate intellectual property (IP) component to increase processing speed of multimedia data. For example, the accelerator 180 may be provided as an intellectual property (IP) component to enhance processing performance of text, audio, still images, animation, video, two-dimensional data or three-dimensional data.

A system interconnector 190 may be a system bus to provide an on-chip network in the system-on-chip (SoC). The system interconnector 190 may include, for example, a data bus, an address bus, and a control bus. The data bus is a data transfer path. A memory access path to the working memory 130 or the storage device 170 may also be provided. The address bus provides an address exchange path between intellectual properties (IPs). The control bus provides a path along which a control signal is transmitted between intellectual properties (IPs). However, the configuration of the system interconnector 190 is not limited to the above description and the system interconnector 190 may further include arbitration means for efficient management.

Figure 4:
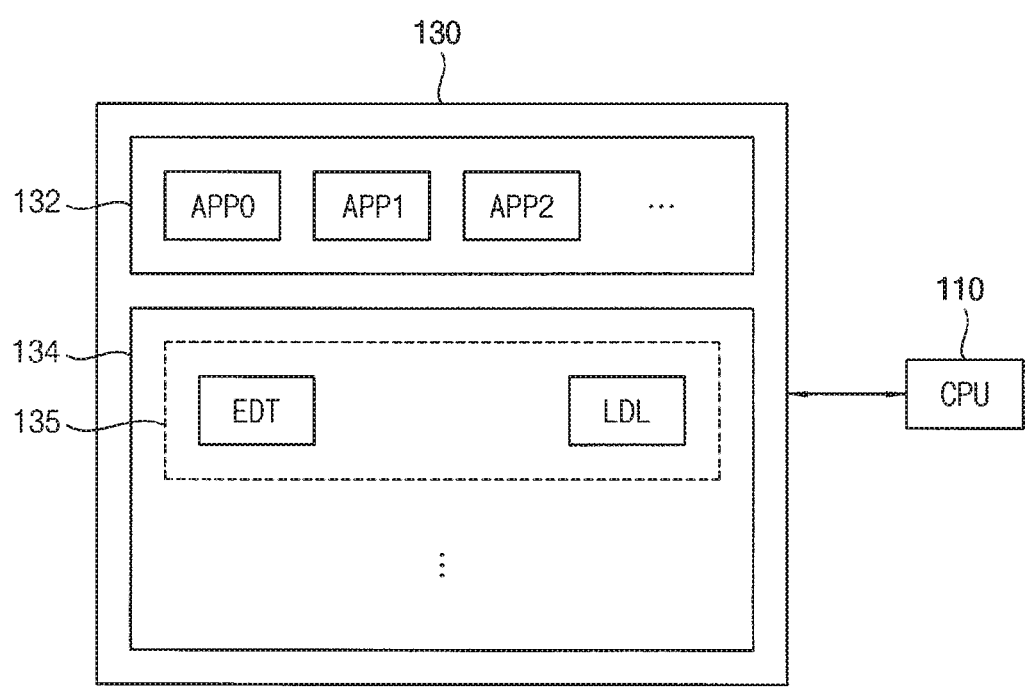
FIG. 4 is a diagram illustrating an example embodiment of a task scheduler implemented in the multi-core system of FIG. 3.

FIG. 4 is a diagram illustrating an example embodiment of a task scheduler implemented in the multi-core system of FIG. 3.

FIG. 4 illustrates a software structure of the multi-core system 1000 shown in FIG. 3. Referring to FIG. 3, a software layer structure of the multi-core system 1000 loaded into the working memory 130 and driven by the CPU 110 may be divided into an application program 132 and a kernel 134. The operating system (OS) may further include one or more device drivers to manage various devices such as a memory, a modem, and an image processing device.

The application program 132 may be an upper layer of software driven as a basic service or driven by a user's request. A plurality of application programs App0, App1 and App2 may be simultaneously executed to provide various services. The application programs App0, App1 and App2 may be executed by the CPU 110 after being loaded into the working memory 130. For example, when playing of a video file is requested by the user, an application program (e.g., video player) is executed to play the video file. Then the executed player may generate a read request or a write request to the storage device 170 to play the video file requested by the user.

The kernel 134, as a component of the operating system (OS), may perform a control operation between the application program 132 and hardware. The kernel 134 may provide program execution, interrupts, multi-tasking, and memory management, and may include a file system, and a device driver. The scheduler 135 may be provided as a portion of the kernel 134.

The scheduler 135 monitors and manages a task queue for each of the processor cores. The task queue is a queue of active tasks when a plurality of tasks are simultaneously performed. For example, tasks existing in the task queue may be quickly processed by the processor 110, as compared to other tasks. The scheduler 135 may determine a subsequent process with reference to task information loaded into the task queue. For example, the scheduler 135 decides the priority of CPU resources according to a value of the task queue. In a Linux kernel, a plurality of task queues correspond to a plurality of processor cores, respectively.

The scheduler 135 may assign the tasks respectively corresponding to the task queues to corresponding cores, respectively. The task loaded into the task queue to be performed by the processor 110 is called a runnable task.

According to an exemplary embodiment of the inventive concept, the scheduler 135 includes an execution delay tracker EDT and a control logic LDL. The delay tracker EDT may also be referred to as control logic or implemented by control logic (e.g., second control logic).

The execution delay tracker EDT may monitor task execution delay times with respect to tasks respectively assigned to the plurality of processor cores and core execution delay times with respect to the plurality of processor cores. The control logic LDL may control an operation of the multi-core system based on the task execution delay times and the core execution delay times.

Figure 5:
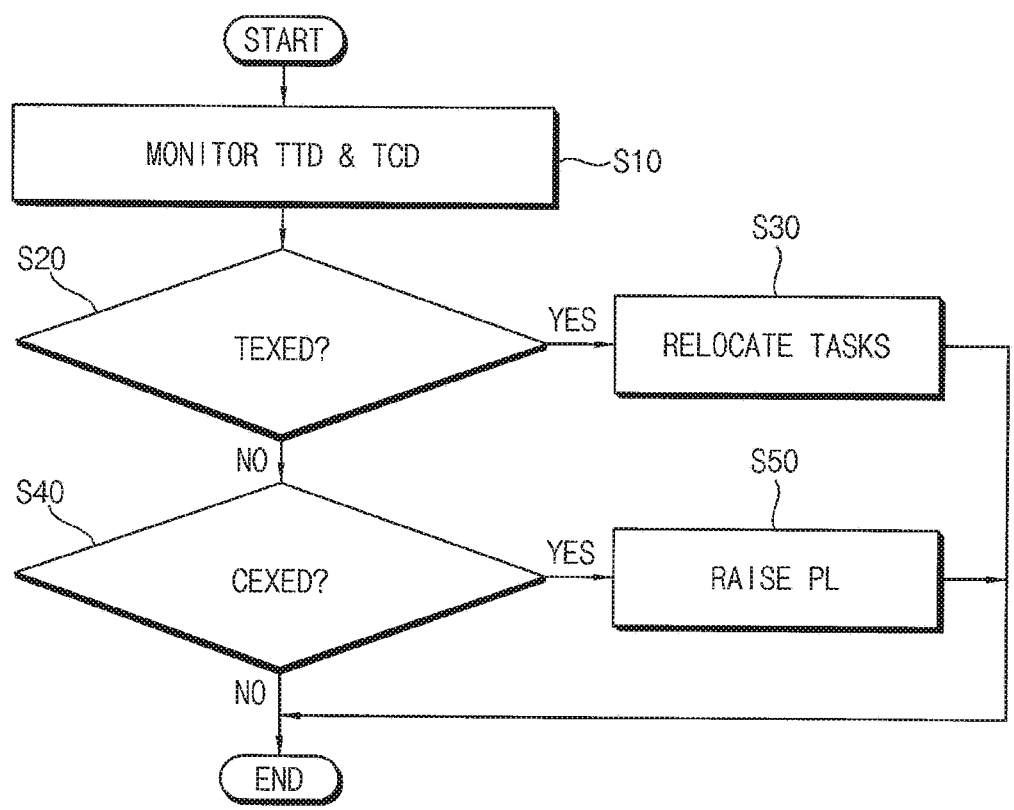
FIG. 5 is a flow chart illustrating a method of controlling an operation of a multi-core system according to an exemplary embodiment of the inventive concept.

FIG. 5 is a flow chart illustrating a method of controlling an operation of a multi-core system according to an exemplary embodiment of the inventive concept.

Referring to FIGS. 1, 4 and 5, the execution delay tracker EDT of the task scheduler 135 monitors the task execution delay times TTD with respect to tasks respectively assigned to the plurality of processor cores C1~C8 and the core execution delay times TCD with respect to the plurality of processor cores C1~C8 (S10).

The control logic LDL of the task scheduler 135 determines whether a task execution delay TEXED has occurred with respect to the tasks assigned to each processor core based on the task execution delay times TTD and the core execution delay times TCD (S20).

When it is determined that the task execution delay TEXED has occurred (S20: YES) with respect to a given one of the processor cores, the control logic LDL relocates a portion of the tasks assigned to the given one processor core to another one of the processor cores (S30).

When it is determined that the task execution delay TEXED has not occurred (S20: NO), the control logic LDL determines whether the core execution delay CEXED has occurred with respect to the tasks assigned to each processor core based on the task execution delay times TTD and the core execution delay times TCD (S40).

When it is determined that the core execution delay CEXED has occurred (S40: YES), the control logic LDL increases (raises) a power level of each processor core for which the core execution delay CEXED has occurred (S50). In an alternate embodiment, when it is determined that the core execution delay CEXED has occurred (S40: YES), the control logic LDL raises an operating frequency of each processor core for which the core execution delay CEXED has occurred.

When it is determined that the core execution delay CEXED has not occurred (S40: NO), the control logic LDL maintains the previous scheduling periods and power levels.

According to exemplary embodiments of the inventive concept, the task execution delay times with respect to the respective tasks and the core execution delay times with respect to the respective processor cores may be monitored and the degree of the task execution delay may be managed. According to the degree of the task execution delay, the tasks may be efficiently distributed to the processor cores and/or the processing ability or the power level may be controlled, to optimize performance and resource utilization.

Task scheduling can be based on positive feedback of the previous task scheduling. The positive feedback indicates the processing time or the utilization when the tasks are scheduled normally.

In contrast, task scheduling according to at least one embodiment of the inventive concept is based on negative feedback. In an exemplary embodiment, negative feedback indicates the standby time or the opportunity cost when the tasks are not scheduled normally.

Task scheduling based on positive feedback may secure the required performance in most cases, but may cause starvation of a specific task or degraded user experiences according to task characteristics and the operation environments of the system. At least one exemplary embodiment of the inventive concept may minimize execution delay of tasks and resource utilization using such negative feedback.

As such, a multi-core system and method of controlling an operation of the multi-core system according to at least one exemplary embodiment of the inventive concept may reduce or eliminate task starvation where a specific task is not processed for a long time, using the task execution delay times and core execution delay times and implement efficient task scheduling even for the tasks having high dependency on data.

FIGS. 6 through 9 are diagrams illustrating a method of controlling an operation of a multi-core system according to exemplary embodiments of the inventive concept.

Figure 6:
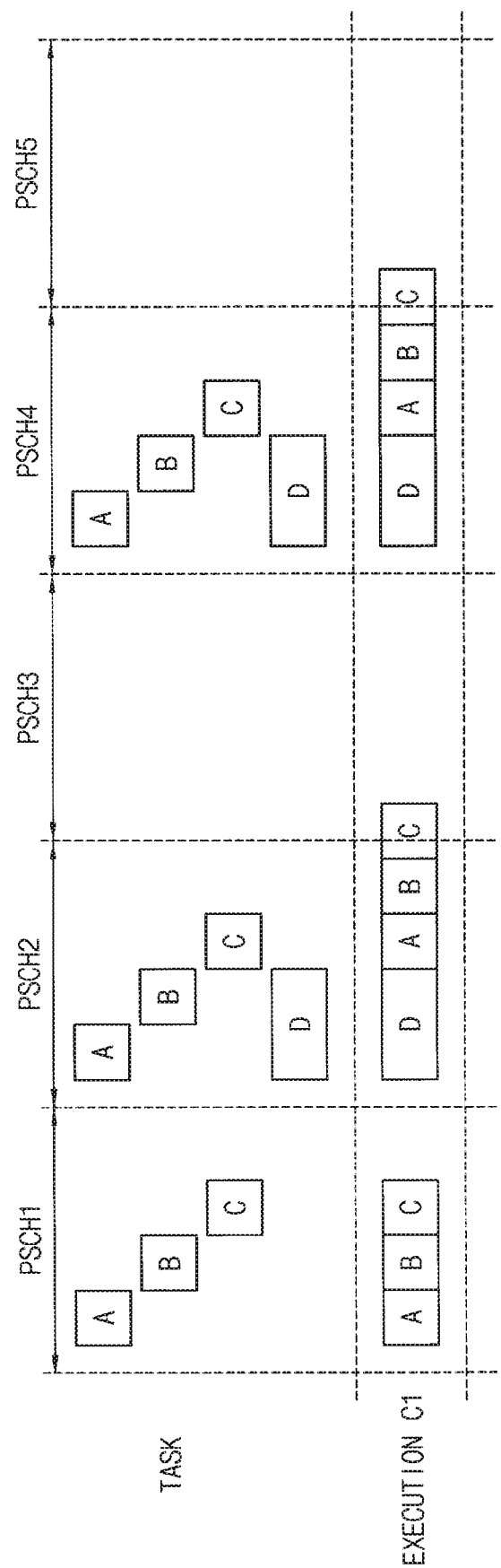
FIGS. 6 through 9 are diagrams illustrating a method of controlling an operation of a multi-core system according to an exemplary embodiment of the inventive concept.

FIG. 6 illustrates an example of task scheduling performed without using a method designed according to the inventive concept. For example, a first task A, a second task B and a third task C may operate interactively, and a fourth task D may have a higher priority than the first task A, the second task B and the third task C.

Referring to FIG. 6, the first task A, the second task B, the third task C and the fourth task D are periodically assigned to and processed by a first processor core C1 according to scheduling periods of the same time interval. FIG. 6 illustrates an example of the tasks assigned to the first processor core C1 and the task execution order with respect to first through fifth scheduling periods PSCH1~PSCH5.

In the first scheduling period PSCH1, because the execution time of the first task A, the second task B and the third task C is shorter than the first scheduling period PSCH1, the task execution may be performed successfully and the task scheduling for the second scheduling period PSCH2 may be performed normally.

If the fourth task D is additionally assigned to the first processor core C1 in the second scheduling period PSCH2, the execution time of the first task A, second task B, the third task C and the fourth task D is longer than the second scheduling period PSCH2, the task execution may be unsuccessful due to a task execution delay or a core execution delay.

As a result, the control logic LDL does not perform the task scheduling for the third scheduling period PSCH3. If the previous scheduling is maintained, such inefficient task scheduling will be repeated during the fourth scheduling period PSCH4 and the fifth scheduling period PSCH5.

Figure 7:
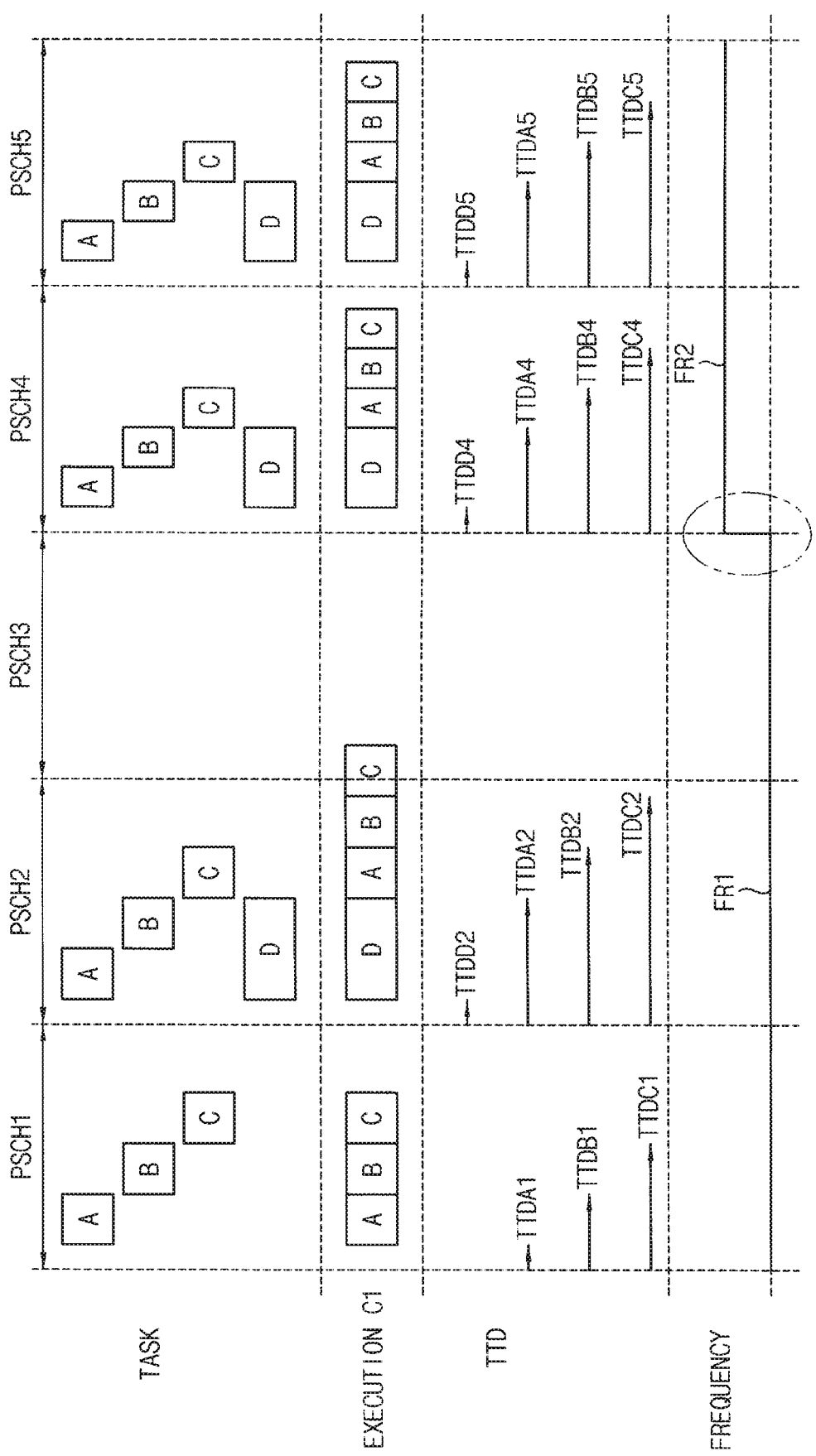
Figure 8:
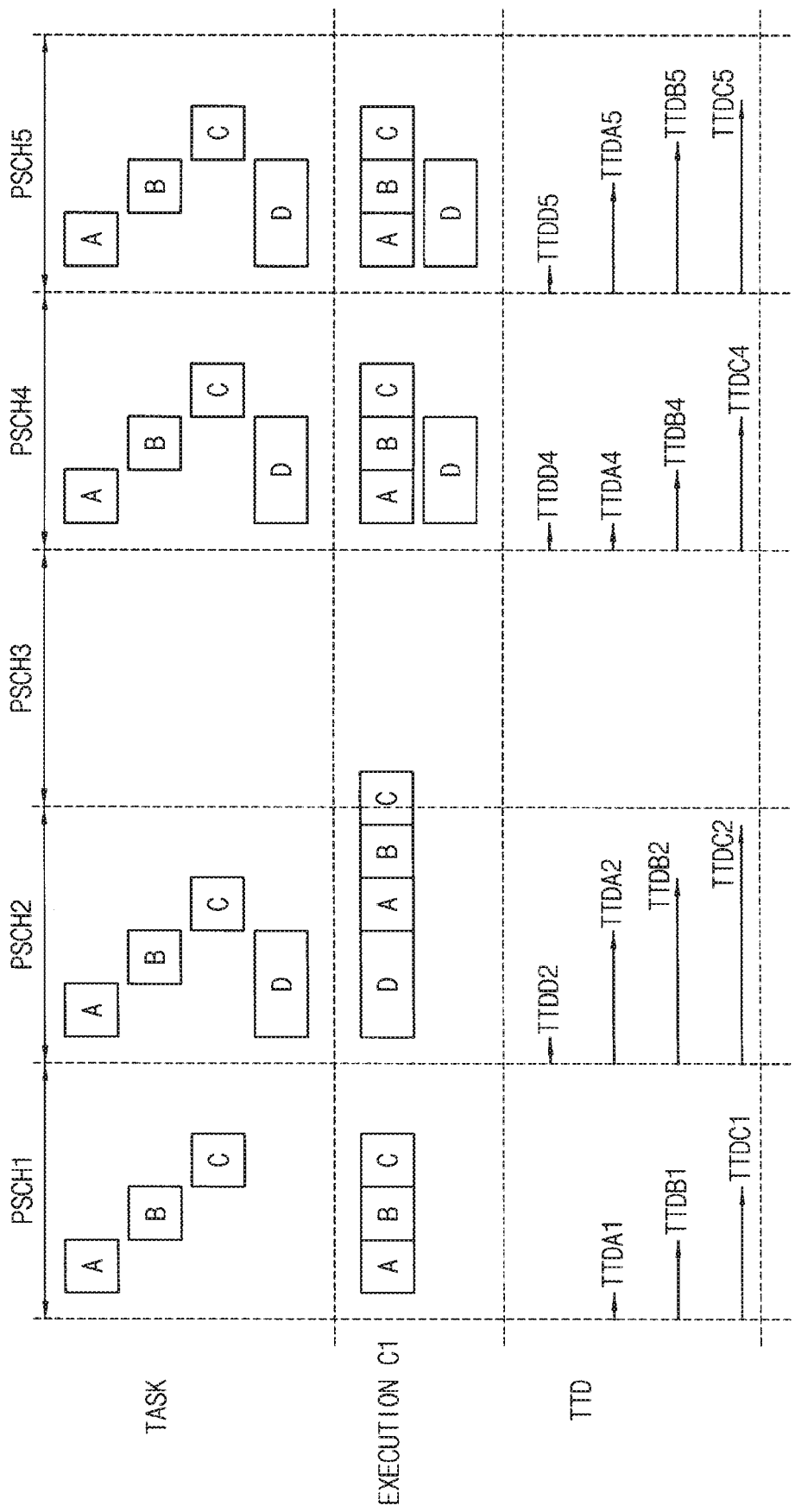
Figure 9:
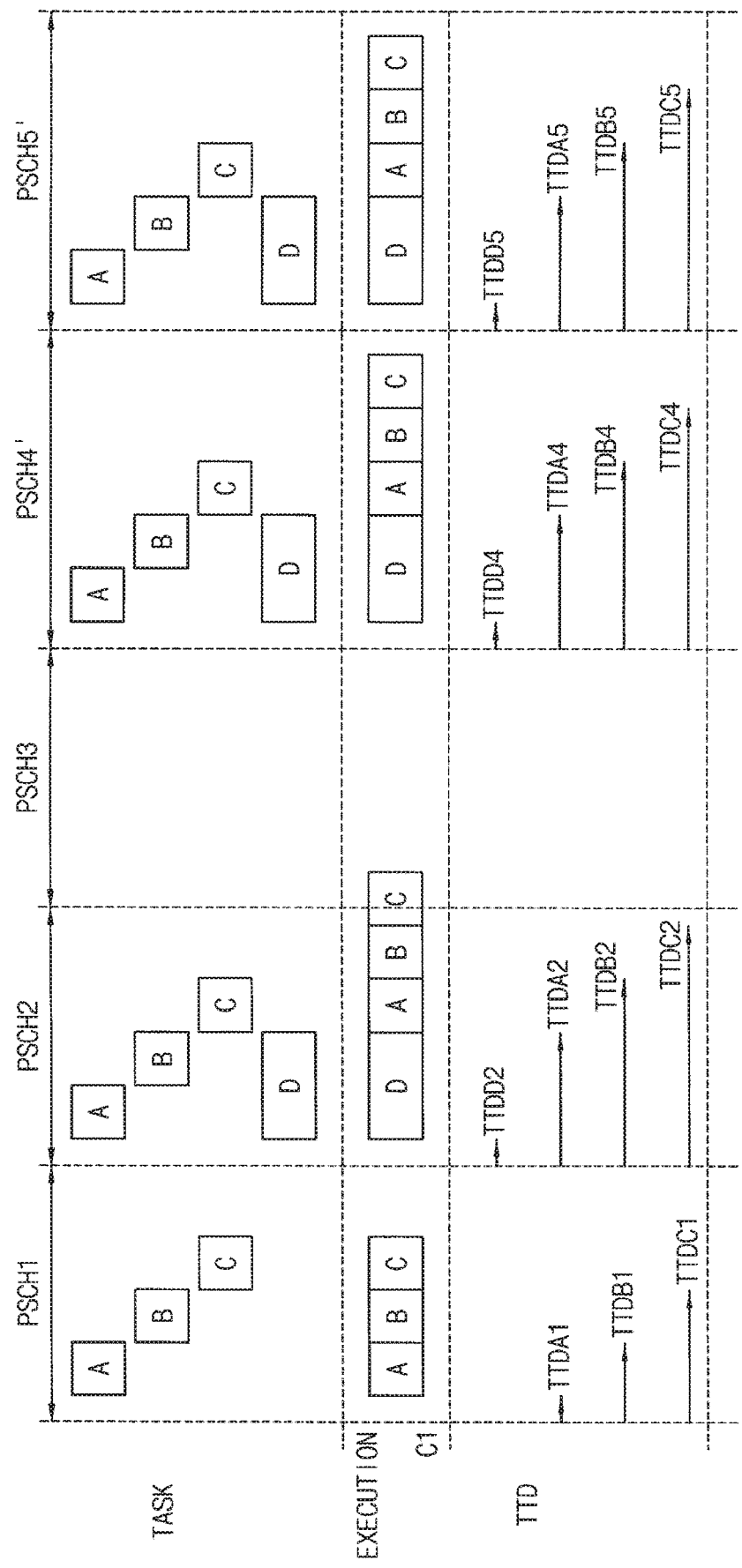

FIGS. 7, 8 and 9 illustrate examples of task scheduling performed using methods according to exemplary embodiments of the inventive concept. For example, a first task A, a second task B and a third task C may operate interactively, and a fourth task D may have a higher priority than the first task A, the second task B and the third task C.

Referring to FIG. 7, the first task A, the second task B, the third task C and the fourth task D may be periodically assigned to and processed by a first processor core C1 according to scheduling periods of the same time interval. FIG. 6 illustrates an example of the tasks assigned to the first processor core C1 and the task execution order with respect to first through fifth scheduling periods PSCH1~PSCH5.

The execution delay tracker EDT of the task scheduler 135 monitors the task execution delay times $TTD_{ij}$ with respect to tasks respectively assigned to the plurality of processor cores C1~C8. Here i is an index of a task corresponding to A, B, C or D and j is an index of a scheduling period corresponding to 1, 2, 3, 4 or 5.

A task execution delay time TTDij associated with a task of a given processor core may correspond to a standby time while the task is not executed by the given processor core after the task is stored in a task queue of the given processor core.

In an exemplary embodiment, as illustrated in FIG. 7, the execution delay tracker EDT may provide, as each task execution delay time TTDij, a start standby time while a task is not executed by a corresponding processor core after the task is stored in a task queue of the corresponding processor core. In an exemplary embodiment, the task execution delay times are not calculated when the task scheduling is not performed.

In an exemplary embodiment of the inventive concept, the execution delay tracker EDT may provide, as each core execution delay time, a sum of the task execution delay times assigned to each processor core. In the example of FIG. 7, the execution delay tracker EDT may provide, as the core execution delay time of the first processor core C1, (TTDA1+TTDB1+TTDC1) in the first scheduling period PSCH1, (TTDA2+TTDB2+TTDC2+TTDD2) in the second scheduling period PSCH2, (TTDA4+TTDB4+TTDC4+TTDD4) in the fourth scheduling period PSCH4, and (TTDA5+TTDB5+TTDC5+TTDD5) in the fifth scheduling period PSCH5.

In an exemplary embodiment of the inventive concept, the execution delay tracker EDT may provide, as each core execution delay time, a maximum task execution delay time of the task execution delay times assigned to each processor core. In the example of FIG. 7, the execution delay tracker EDT may provide, as the core execution delay time of the first processor core C1, TTDC1 in the first scheduling period PSCH1, TTDC2 in the second scheduling period PSCH2, TTDC4 in the fourth scheduling period PSCH4, and TTDC5 in the fifth scheduling period PSCH5.

Referring back to FIG. 7, in the first scheduling period PSCH1, because the execution time of the first task A, second task B and the third task C is shorter than the first scheduling period PSCH1, the task execution may be performed successfully and the task scheduling for the second scheduling period PSCH2 may be performed normally.

If the fourth task D is additionally assigned to the first processor core C1 in the second scheduling period PSCH2, the execution time of the first task A, second task B, the third task C and the fourth task D is longer than the second scheduling period PSCH2, and the task execution may be unsuccessful due to a task execution delay or a core execution delay. As a result, the control logic LDL does not perform the task scheduling for the third scheduling period PSCH3.

In such a case according to an exemplary embodiment of the inventive concept, the control logic LDL of the task scheduler 135 determines whether the task execution delay or the core execution delay has occurred, and then increases (raises) the power level of the processor core.

FIG. 7 illustrates raising of the power level, such that, for example, the operation frequency of the first processor core C1 is increased from a first frequency FR1 to a second frequency FR2 in the fourth scheduling period PSCH4. The execution time of the tasks may be shortened due to the frequency increase, and the task execution may be successful during the fourth scheduling period PSCH4 and the fifth scheduling period PSCH5. For example, due to the increase of the operation frequency, the first task A, the second task B, the third task C, and the fourth task D may all be executed successfully within the fourth scheduling period PSCH4 and the fifth scheduling period PSCH5. As such, efficient task scheduling may be performed according to example embodiments.

Referring to FIG. 8, the first task A, the second task B, the third task C and the fourth task D are periodically assigned to and processed by a first processor core C1 according to scheduling periods of the same time interval. FIG. 6 illustrates an example of the tasks assigned to the first processor core C1 and the second processor core C2 and the task execution order with respect to first through fifth scheduling periods PSCH1~PSCH5.

Hereinafter, repetitious descriptions associated with FIG. 7 are omitted.

Referring again to FIG. 8, in the first scheduling period PSCH1, because the execution time of the first task A, second task B and the third task C is shorter than the first scheduling period PSCH1, the task execution may be performed successfully and the task scheduling for the second scheduling period PSCH2 may be performed normally.

If the fourth task D is additionally assigned to the first processor core C1 in the second scheduling period PSCH2, the execution time of the first task A, second task B, the third task C and the fourth task D is longer than the second scheduling period PSCH2, and the task execution may be unsuccessful due to a task execution delay or a core execution delay.

In such a case according to an exemplary embodiment of the inventive concept, the control logic LDL of the task scheduler 135 determines whether a task execution delay or a core execution delay has occurred for a given task assigned to a give processor core of the processor cores, and then relocates the given task assigned to given processor core to another one of the processor core if the task execution delay or the core execution delay has occurred.

FIG. 8 illustrates relocating of the tasks such that the first task A, the second task B and the third task C are maintained to be assigned to the first processor core C1 and the fourth task D is relocated to be assigned to the second processor core C2 in the fourth scheduling period PSCH4.

As such, due to such relocating of the tasks, the task execution may be successful during the fourth scheduling period PSCH4 and the fifth scheduling period PSCH5 and efficient task scheduling may be performed according to example embodiments.

The control logic LDL may control task scheduling periods or a power level of the multi-core system based on changes of the task execution delay times or the core execution delay times. For example, when the task execution time of the first task A, the second task B and the third task C is increased largely beyond a permitted degree by adding the fourth task D, the control logic LDL may relocate the fourth task D to another processor core.

Referring to FIG. 9, the first task A, the second task B, the third task C and the fourth task D are periodically assigned to and processed by a first processor core C1 according to scheduling periods of the same time interval. FIG. 6 illustrates an example of the tasks assigned to the first processor core C1 and the task execution order with respect to first through fifth scheduling periods PSCH1~PSCH5.

Hereinafter, repetitious descriptions associated with FIG. 7 are omitted.

Referring again to FIG. 9, in the first scheduling period PSCH1, because the execution time of the first task A, second task B and the third task C is shorter than the first scheduling period PSCH1, the task execution may be performed successfully and the task scheduling for the second scheduling period PSCH2 may be performed normally.

If the fourth task D is additionally assigned to the first processor core C1 in the second scheduling period PSCH2, the execution time of the first task A, second task B, the third task C and the fourth task D is longer than the second scheduling period PSCH2, and the task execution may be unsuccessful due to a task execution delay or a core execution delay.

In such a case according to an exemplary embodiment of the inventive concept, the control logic LDL of the task scheduler 135 determines whether the task execution delay or the core execution delay has occurred for each processor core and then increases the scheduling period of the corresponding processor core for which the task execution delay or the core execution delay has occurred.

FIG. 9 illustrates increasing the scheduling period such that the fourth scheduling period PSCH4' is increased to be longer than the previous scheduling periods PSCH1~PSCH4. These embodiments may be adopted when the latency requirement level of the tasks is relatively low.

As such, due to such increasing of the scheduling period, the task execution may be successful during the fourth scheduling period PSCH4 and the fifth scheduling period PSCH5 and efficient task scheduling may be performed according to example embodiments. For example, if the scheduling periods were previously a first duration, and a task execution delay or a core execution delay has occurred during a given one of the scheduling periods (e.g., PSCH2), the scheduling periods could then be increased to a second duration greater than the first duration. In an exemplary embodiment, the scheduling period (e.g., PSCH3) after the scheduling period (e.g., PSCH2) in which the delay is discovered is skipped and the increase is applied to the next scheduling period (e.g., PSCH4') and those that occur after the next scheduling period (e.g., PSCH5'). For example, the fourth scheduling period PSCH4 of a first duration is increased to the fourth scheduling period PSCH4' of the second duration and the fifth scheduling period PSCH5 of the first duration is increased to the fifth scheduling period PSCH5' of the second duration.

Figure 10:
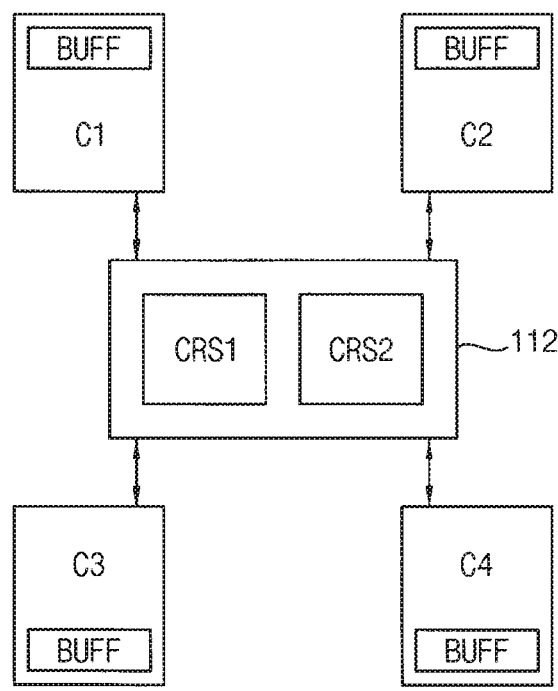
FIG. 10 is a block diagram illustrating an example embodiment of a processor included in the multi-core system of FIG. 3.

FIG. 10 is a block diagram illustrating an example embodiment of a processor included in the multi-core system of FIG. 3.

Referring to FIG. 10, a processor 111 may include, for example, four processor cores C1~C4 and a common circuit 112 that is used and shared by the processor cores C1~C4. The common circuit 112 may include one or more common resources CRS1 and CRS2.

The processor cores C1~C4 may include a buffer BUFF, respectively, to store input data, intermediate data generated during processing, and a processing result data.

When one processor core requires use of a common resource (e.g., CRS1) while another processor core is using the same common resource, the one processor core stands by (e.g., is idle) until the another processor core stops using the common resource or the one processor gains access the common resource. As a result, the one processor core does not execute the task requiring the common resource even though other tasks are not executed in the one processor core. The time for which an already-started task stands by may be referred to as a stall time. For example, a given processor core can continue executing instructions of a given task until it encounters an instruction that requires a resources it does not have access to, and then the given processor core may remain idle (stall) until gaining access to the resource.

Figure 11:
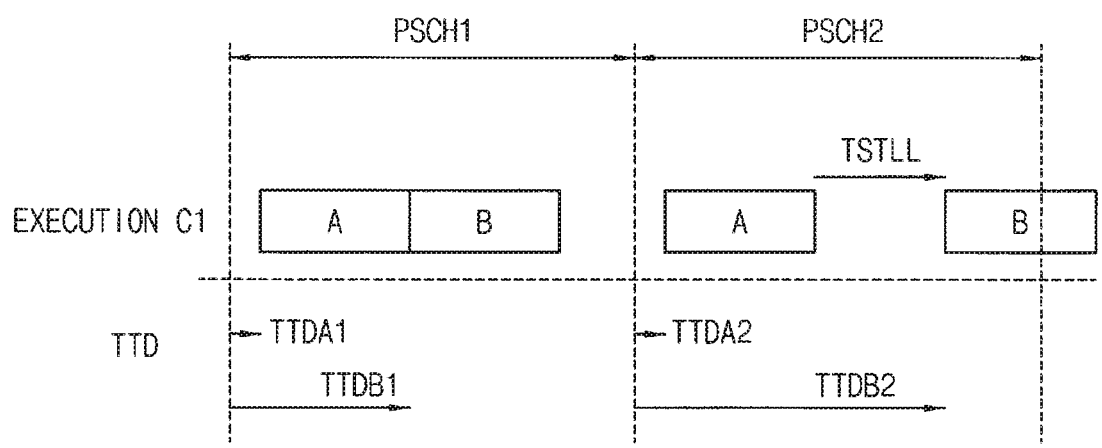
FIGS. 11 and 12 are diagrams illustrating examples of task execution delay times used in a method of controlling an operation of a multi-core system according to exemplary embodiments of the inventive concept.
Figure 12:
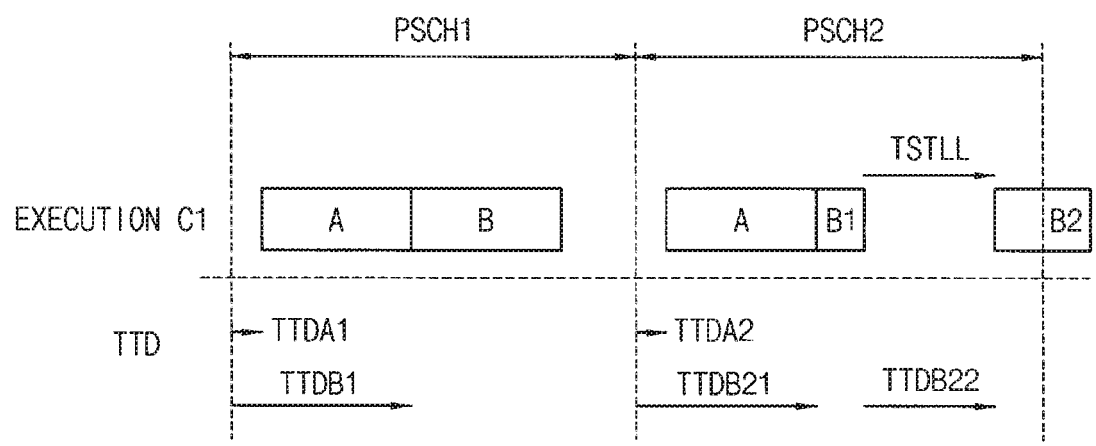

FIGS. 11 and 12 are diagrams illustrating examples of task execution delay times used in a method of controlling an operation of a multi-core system according to an exemplary embodiment of the inventive concept.

FIGS. 11 and 12 illustrate the task execution delay times reflecting the stall time as described with reference to FIG. 10.

In some example embodiments, the execution delay tracker EDT of the task scheduler 135 may provide, as a task execution delay time $TTDij$, a sum of a start standby time from a time point when a given task is stored in a given task queue of a given processor core to a start time point when the given processor core starts executing the given task and a stall time while the given processor core stops executing the given task after the start time point. Here i is an index of a task corresponding A or B and j is an index of a scheduling period corresponding to 1 or 2 for the example of FIG. 11.

In the first scheduling period PSCH1, the execution delay tracker EDT may provide, as a task execution delay time, the start standby time from a time point when a given task is stored in the task queue of a given processor core to a start time point when the given processor core starts executing of the given task, as described with reference to FIG. 7.

In the second scheduling period PSCH2, the stall time TSTLL has occurred and the execution delay tracker EDT may provide, as a task execution delay time, the sum of the start standby time and the stall time.

As a result, in the second scheduling period PSCH2, TTDB2 may be provided as the task execution delay time of the second task B in FIG. 11, and (TTDB21+TTDB22) may be provided as the task execution delay time of the second task B in FIG. 12.

Figure 13:
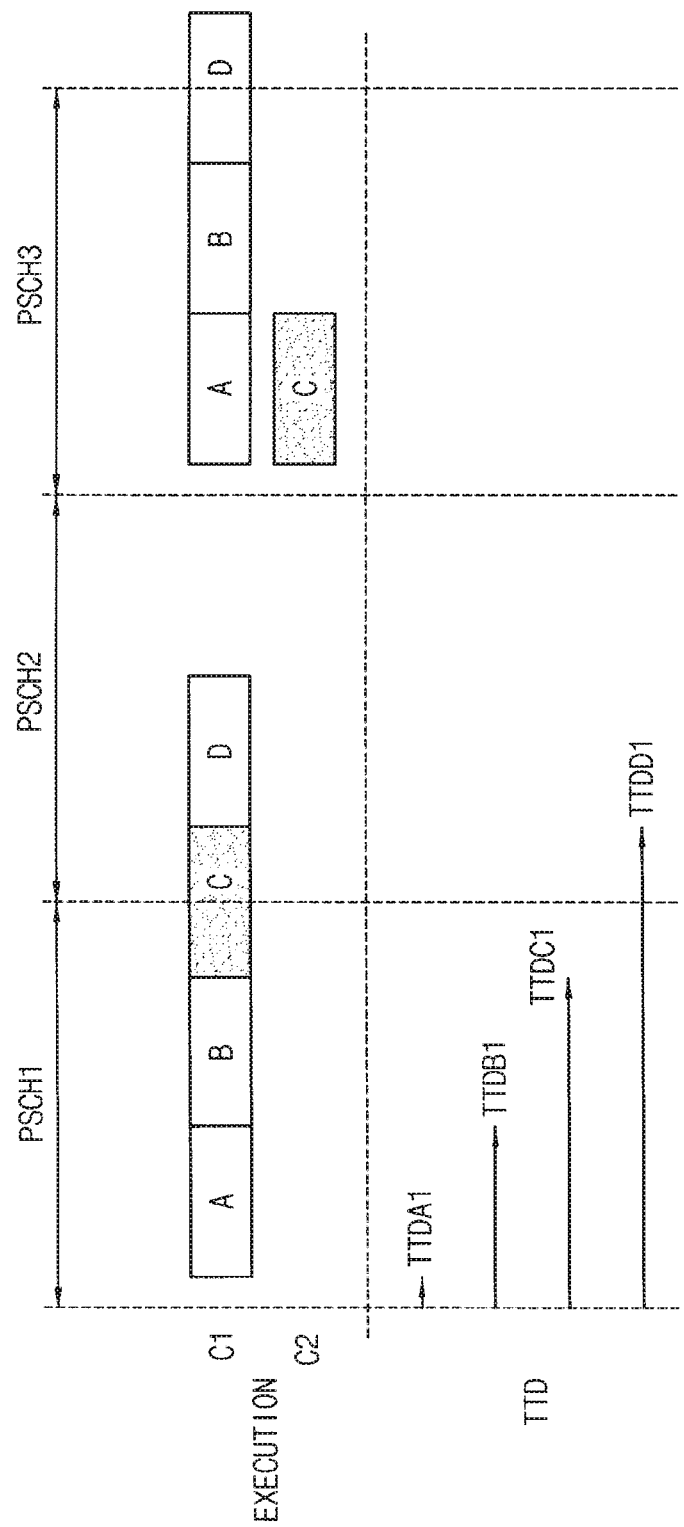
FIGS. 13 and 14 are diagrams illustrating a method of controlling an operation of a multi-core system according to exemplary embodiments of the inventive concept.
Figure 14:
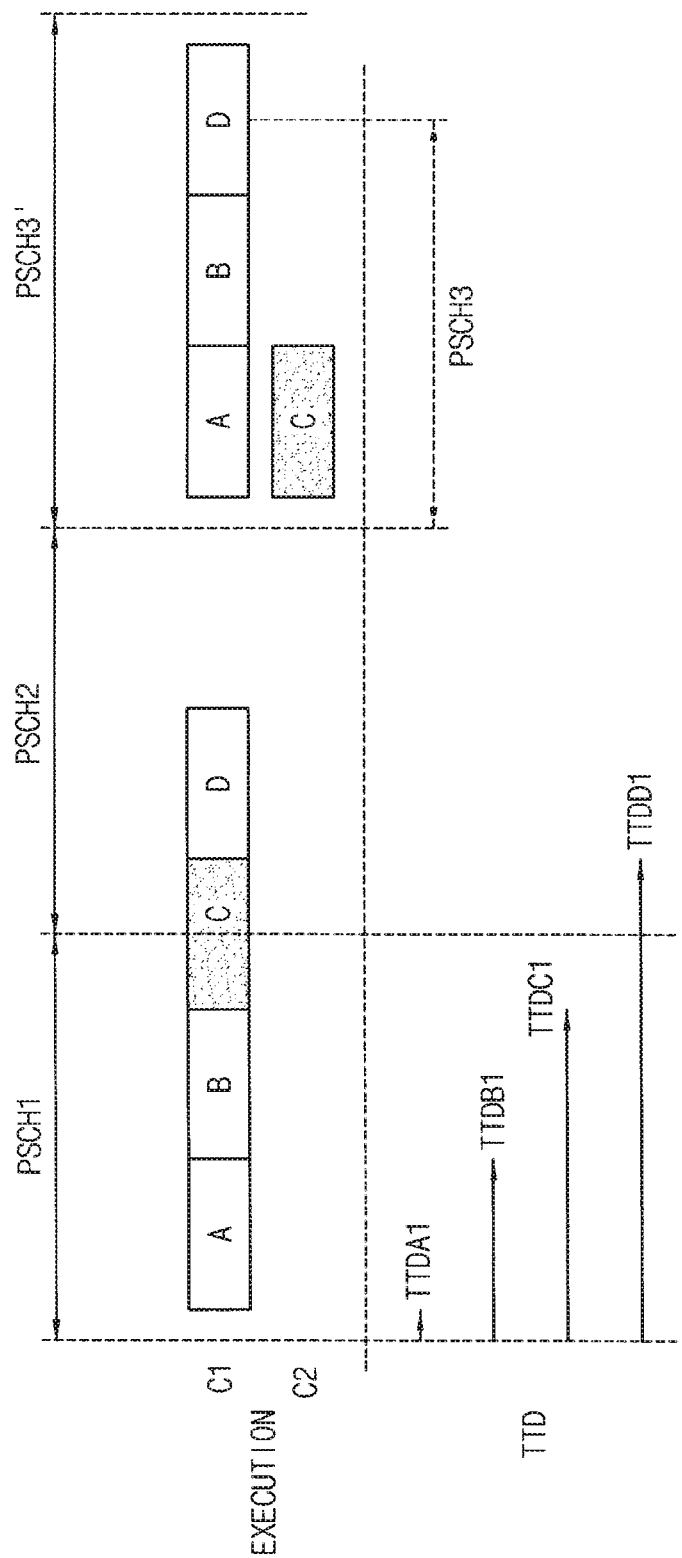

FIGS. 13 and 14 are diagrams illustrating a method of controlling an operation of a multi-core system according to an exemplary embodiment of the inventive concept.

Referring to FIG. 13, in the first scheduling period PSCH1, because the execution time of the first task A, the second task B, the third task C and the fourth task D is longer than the first scheduling period PSCH1, the task execution may be unsuccessful due to a task execution delay or a core execution delay. As a result, the control logic LDL does not perform the task scheduling for the second scheduling period PSCH2.

In such a case according to an exemplary embodiment, the control logic LDL of the task scheduler 135 determines whether the task execution delay or the core execution delay has occurred, and then divides the tasks assigned to the each processor core into an urgent task group and a normal task group based on latency requirement levels of the tasks. The control logic LDL may relocate the urgent task group and the normal task group to be assigned to different processor cores when it is determined that the task execution delay or the core execution delay has occurred for one or more of processor cores.

FIG. 13 illustrates an example where the first task A, the second task B and the fourth task D are included in the normal task group and the third task C is included in the urgent task group. In this case, the normal task group A, B and D is assigned to the first processor core C1 and the urgent task group D is assigned to the second processor core C2. Even though the task scheduling is not performed normally in the first processor core C1, there is no serious problem because the tasks A, B and D of the low latency requirement level are assigned to the first processor core C1.

While relocating the normal task group A, B and D and the urgent task group D to be assigned to different processor cores as described with reference to FIG. 13, the control logic LDL may also increase a scheduling period of at least one of the different processor cores. For example, the third scheduling period PSCH3' of the first processor core C1 may be increased to be longer than the previous scheduling periods PSCH1 and PSCH2. These embodiments may be adopted when the latency requirement level of the tasks is relatively low.

Figure 15:
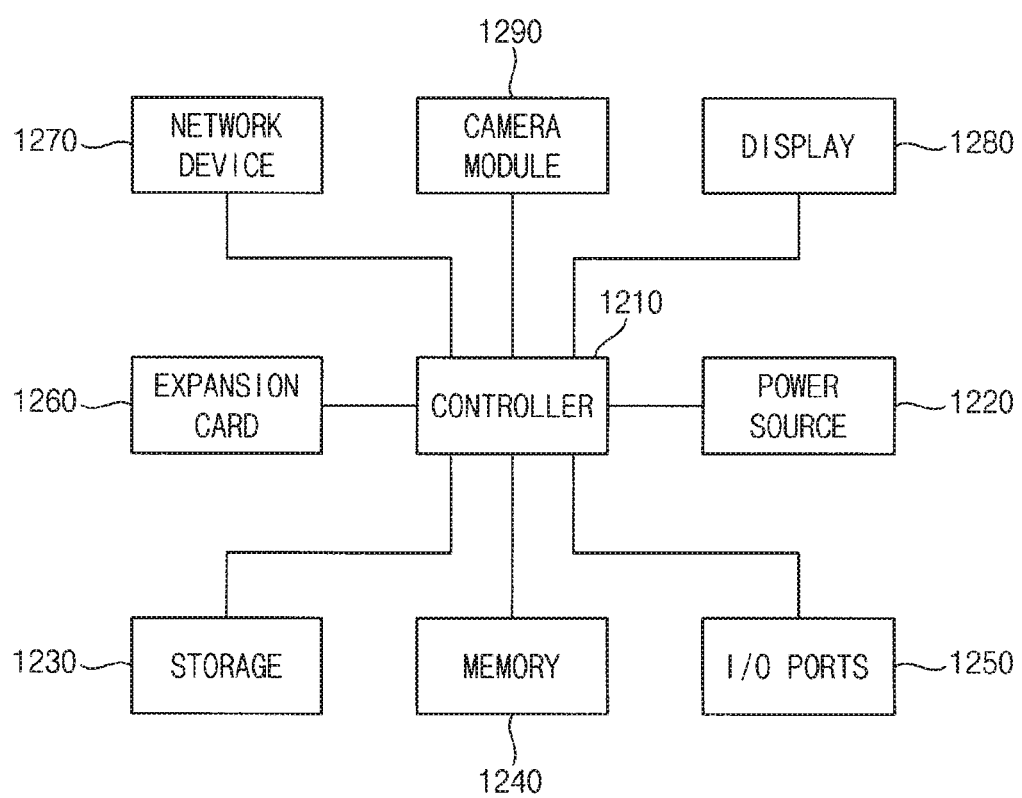
FIG. 15 is a block diagram illustrating an electronic system according to an exemplary embodiment of the inventive concept.

FIG. 15 is a block diagram illustrating an electronic system according to exemplary embodiment of the inventive concept.

Referring to FIG. 15, an electronic system includes a controller 1210 (e.g., a control circuit), a power source 1220 (e.g., a power supply), a storage 1230 (e.g., a storage device), a memory 1240 (e.g., a storage device), I/O ports 1250, an expansion card 1260, a network device 1270, and a display 1280. According to exemplary embodiments, the electronic system may also include a camera module 1290.

The controller 1210 may control the operation of each of the elements 1220 through 1280. The power source 1220 may supply an operating voltage to at least one of the elements 1210 and 1230 through 1280. The storage 1230 may be implemented as a hard disk drive (HDD) or an SSD. The memory 1240 may be implemented as a volatile or non-volatile memory. The I/O ports 1250 may transmit data to the electronic system or transmit data output from the electronic system to an external device. For example, the I/O ports 1250 may include a port for connection with a pointing device such as a computer mouse, a port for connection with a printer, and a port for connection with a universal serial bus (USB) drive.

The expansion card 1260 may be implemented as a secure digital (SD) card or an MMC. The expansion card 1260 may be a subscriber identity module (SIM) card or a universal SIM (USIM) card.

The network device 1270 enables the electronic system to be connected with a wired or wireless network. The display 1280 displays data output from the storage 1230, the memory 1240, the I/O ports 1250, the expansion card 1260, or the network device 1270.

The camera module 1290 is a module that can convert an optical image into an electrical image. Accordingly, the electrical image output from the camera module 1290 may be stored in the storage 1230, the memory 1240, or the expansion card 1260. In addition, the electrical image output from the camera module 1290 may be displayed through the display 1280. For example, the camera module 1290 may include a camera.

The controller 1210 may be a multi-core system as described above. For example, the controller 1210 may include the processor 110 and the task scheduler 135 of FIG. 1. According to an exemplary embodiment of the inventive concept, the controller 1210 includes the execution delay tracker EDT and the control logic LDL as described above, to perform task scheduling based on negative feedback using the task execution delay times and the core execution delay times.

As such, a multi-core system and method of controlling an operation of the multi-core system according to at least one exemplary embodiment of the inventive concept may reduce or elimination task starvation such that a specific task is not processed for a long time, using the task execution delay times and core execution delay times and implement efficient task scheduling even for the tasks having high dependency on data.

The inventive concept may be applied to various electronic devices and systems requiring efficient multi-processing. For example, an embodiment of the inventive concept may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book reader, a virtual reality (VR) device, an augmented reality (AR) device, etc.

The foregoing is illustrative of example embodiments and is not to be construed as limiting thereof. Although a few exemplary embodiments have been described, those skilled in the art will readily appreciate that many modifications are possible in these exemplary embodiments without materially departing from the present inventive concept.

What is claimed is:

1. A method of controlling an operation of a system on chip (SoC) including a processor comprising a plurality of processor cores, the method comprising:
   the processor executing a kernel of an operating system to monitor a task queue of each of the processor cores for determining a task execution delay time for each task among a plurality of tasks respectively assigned to the plurality of processor cores, to generate a plurality of task execution delay times;
   determining, by the kernel, a core execution delay time for each core among the plurality of processor cores from a single time among the task execution delay times associated with the tasks assigned to the corresponding core, to generate a plurality of core execution delay times, wherein the single time is a largest time among the task execution delay times associated with the tasks assigned to the corresponding core;
   determining, by the kernel, whether a delay has occurred in a first processor core among the processor cores based on the core execution delay time of the first processor core;
   outputting, by the kernel, a control request to a performance controller of the SoC when the kernel determines the delay has occurred; and
   increasing, by the performance controller, a power level of the first processor core in response to receipt of the control request.

2. The method of claim 1, wherein the task execution delay time of a given task of the tasks assigned to a given processor core of the processor cores corresponds to a standby time while the given task is not executed by the given processor core after the given task is stored in a task queue of the given processor core.

3. The method of claim 2, wherein the task execution delay time of the given task corresponds to a start standby time from a time point when the given task is stored in the task queue to a start time point when the given processor core starts executing the given task.

4. The method of claim 2, wherein the task execution delay time of the given task corresponds to a sum of a start standby time from a time point when the given task is stored in the task queue to a start time point when the given processor core starts executing of the given task and a stall time while the given processor core stops executing the given task after the start time point.

5. The method of claim 1, wherein increasing the power level of the first processor core comprises:
   increasing an operation frequency of the first processor core.

6. The method of claim 1, further comprises:
increasing a scheduling period of at least one of the processor cores when it is determined that the task execution delay or the core execution delay has occurred for at least one of the processor cores.

7. The method of claim 1 further comprises:
determining whether a task execution delay has occurred with respect to a given task of the tasks assigned to a given processor core of the processor cores or whether a core execution delay has occurred with respect to the given processor core, based on the task execution delay time of the given task and the core execution delay time of the given processor core; and
increasing a scheduling period of the given processor core when it is determined that the task execution delay has occurred for the given task or the core execution delay has occurred for the given processor core.

8. A method of controlling an operation of a system on chip (SoC) including a processor comprising a plurality of processor cores, the method comprising:
the processor executing a kernel of an operating system to monitor a task queue of each of the processor cores for determining a task execution delay time for each task among a plurality of tasks respectively assigned to the plurality of processor cores, to generate a plurality of task execution delay times;
determining, by the kernel, a core execution delay time for each core among the plurality of processor cores from a single time among the task execution delay times associated with the tasks assigned to the corresponding core, to generate a plurality of core execution delay times, wherein the single time is a largest time among the task execution delay times associated with the tasks assigned to the corresponding core;
determining, by the kernel, whether a delay has occurred in a first processor core among the processor cores based on the core execution delay time of the first processor core; and
relocating, by the kernel, a given task of the tasks assigned to the first processor core to a second other processor core among the processor cores when it is determined that the delay has occurred.

9. The method of claim 8, wherein the relocating comprises:
dividing the tasks assigned to the first processor core into an urgent task group and a normal task group based on latency requirement levels of the tasks; and
relocating one of the urgent task group and the normal task group to the second processor core.

10. The method of claim 8, wherein the task execution delay time of a given task of the tasks assigned to a given processor core of the processor cores corresponds to a standby time while the given task is not executed by the given processor core after the given task is stored in a task queue of the given processor core.

11. The method of claim 10, wherein the task execution delay time of the given task corresponds to a start standby time from a time point when the given task is stored in the task queue to a start time point when the given processor core starts executing the given task.

12. The method of claim 10, wherein the task execution delay time of the given task corresponds to a sum of a start standby time from a time point when the given task is stored in the task queue to a start time point when the given processor core starts executing of the given task and a stall time while the given processor core stops executing the given task after the start time point.

13. A method of controlling an operation of a system on chip (SoC) including a processor comprising a plurality of processor cores, the method comprising:
the processor executing a kernel of an operating system to monitor a task queue of each of the processor cores for determining a task execution delay time for each task among a plurality of tasks respectively assigned to the plurality of processor cores, to generate a plurality of task execution delay times;
determining, by the kernel, a core execution delay time for each core among the plurality of processor cores from a single time among the task execution delay times associated with the tasks assigned to the corresponding core, to generate a plurality of core execution delay times, wherein the single time is a largest time among the task execution delay times associated with the tasks assigned to the corresponding core;
determining, by the kernel, whether a delay has occurred in a first processor core among the processor cores based on the core execution delay time of the first processor core; and
increasing, by the kernel, a scheduling period of the first processor core when it is determined that the delay has occurred.

14. The method of claim 13, wherein the task execution delay time of a given task of the tasks assigned to a given processor core of the processor cores corresponds to a standby time while the given task is not executed by the given processor core after the given task is stored in a task queue of the given processor core.

15. The method of claim 14, wherein the task execution delay time of the given task corresponds to a start standby time from a time point when the given task is stored in the task queue to a start time point when the given processor core starts executing the given task.

16. The method of claim 15, wherein the task execution delay time of the given task corresponds to a sum of a start standby time from a time point when the given task is stored in the task queue to a start time point when the given processor core starts executing of the given task and a stall time while the given processor core stops executing the given task after the start time point.

* * * * *